US007257455B1

(12) United States Patent
Griffith et al.

(10) Patent No.: US 7,257,455 B1
(45) Date of Patent: Aug. 14, 2007

(54) SYSTEM AND METHOD FOR COLLECTING AND REPRESENTING KNOWLEDGE USING TASK-METHOD-KNOWLEDGE WITH STRUCTURE-BEHAVIOR-FUNCTION IN A COMPUTER SYSTEM

(75) Inventors: Todd Griffith, Williamsport, PA (US); Robert Ross, Williamsport, PA (US)

(73) Assignee: Discovery Machine, Inc., Williamsport, PA (US)

( * ) Notice: Subject to any disclaimer, the term of this patent is extended or adjusted under 35 U.S.C. 154(b) by 446 days.

(21) Appl. No.: 10/028,475

(22) Filed: Dec. 19, 2001

(51) Int. Cl.
*G06F 19/00* (2006.01)
(52) U.S. Cl. ........................ 700/104; 706/45
(58) Field of Classification Search ................ 700/47, 700/49, 104, 246; 706/16, 25, 45, 46, 47, 706/50, 91.7
See application file for complete search history.

(56) References Cited

U.S. PATENT DOCUMENTS

| 4,713,775 A | * | 12/1987 | Scott et al. ................ 706/45 |
| 5,018,215 A | * | 5/1991 | Nasr et al. .................. 382/155 |
| 2002/0174268 A1 | * | 11/2002 | Goward et al. ............. 709/331 |

OTHER PUBLICATIONS

Goel et al., "Functional explanation in design", IJCAI-97 Workshop on Modeling and Reasoning about Function; pp. 1-10.*
Ashok K. Goel, Andres Gomez de Silva Garza, Nathalie Grue, J. William Murdock, and Margaret M. Recker. Functional Explanations in Design. *IJCAI-97 Workshop on Modeling and Reasoning about Function. Intelligence and Design Group, College of Computing, Georgia Institute of Technolog*, pp. 1-10.
J. William Murdock. Prolegomena to a Task-Method-Knowledge Theory of Cognition. *Proceedings of the Twentieth Annual Conference of the Cognitive Science Society*, Madison, WI, Aug. 1-4, 1998, pp. 1-6.
Ashok K. Goel and B. Chandrasekaran. (1992 Academic Press, Inc.) "Case-Based Design: A Task Analysis", Artificial Intelligence in Engineering Design, vol. II, pp. 165-183.

* cited by examiner

*Primary Examiner*—Albert W. Paladini
(74) *Attorney, Agent, or Firm*—Molins & Co (57) ABSTRACT

A system and method are provided for using a plurality of knowledge acquisition approaches to provide a solution to a task. The method includes providing at least one input parameter to define the task and at least one solution parameter to define the solution. A determination is made whether to use a Task-Method-Knowledge approach or a Structure-Behavior-Function approach for processing the task and the task is processed based on the input parameter. If the determined approach is the Task-Method-Knowledge approach, the processing may include determining whether a first portion of the task should be processed independently and whether to use the Task-Method-Knowledge approach or the Structure-Behavior-Function approach for processing the first portion. If the determined approach is the Structure-Behavior-Function approach, the processing may include determining whether a second portion of the task should be processed using the Task-Method-Knowledge approach. The solution is examined relative to the solution parameter.

20 Claims, 7 Drawing Sheets

| TOILET | | | | |
|---|---|---|---|---|
| STRUCTURE | | | | |
| COMPONENTS | | | | |
| *NAME* | *TYPE* | | | |
| BOWL | CONTAINER | | | |
| TANK | CONTAINER | | | |
| VALVE | VALVE | | | |
| FLAPPER | RUBBERPART | | | |
| FLOAT | FLOAT | | | |
| HANDLE | METALPART | | | |
| DRAIN | PIPE | | | |
| SOURCE | PIPE | | | |
| CONNECTIONS | | | | |
| *NAME* | *TYPE* | *FROM* | *TO* | *SUBSTANCE* |
| C1 | PIPE | TANK | BOWL | WATER |
| C2 | PIPE | BOWL | DRAIN | WATER |
| C3 | CHAIN | HANDLE | FLAPPER | USERPRESS |
| C4 | HINGE | FLAPPER | TANK | |
| C5 | LEVER | FLOAT | VALVE | VECTOR |
| C6 | PIPE | VALVE | TANK | WATER |
| C7 | PIPE | SOURCE | VALVE | WATER |
| BEHAVIORS | | | | |
| *NAME* | *TYPE* | | | |
| FILL | PROCEDURE | | | |
| FLUSH | METHOD | | | |
| FUNCTION | | | | |
| *NAME* | *BEHAVIOR* | | | |
| CLEAN | FLUSH | | | |
| *GIVEN NAME* | *GIVEN TYPE* | | | |
| CLEAN WATER | LIQUID | | | |
| FORCE ON HANDLE | FORCE | | | |
| *MAKES NAME* | *MAKES TYPE* | | | |
| CLEAN BOWL | CONTAINER | | | |
| *SUBSTANCE* | | | | |
| WATER | LIQUID | | | |
| USERPRESS | FORCE | | | |
| VECTOR | FORCE | | | |

310 → STRUCTURE
312 → BEHAVIORS
316 → FILL
314 → FUNCTION

| TOILET | | | | |
|---|---|---|---|---|
| STRUCTURE | | | | |
| COMPONENTS | | | | |
| *NAME* | *TYPE* | | | |
| BOWL | CONTAINER | | | |
| TANK | CONTAINER | | | |
| VALVE | VALVE | | | |
| FLAPPER | RUBBERPART | | | |
| FLOAT | FLOAT | | | |
| HANDLE | METALPART | | | |
| DRAIN | PIPE | | | |
| SOURCE | PIPE | | | |
| CONNECTIONS | | | | |
| *NAME* | *TYPE* | *FROM* | *TO* | *SUBSTANCE* |
| C1 | PIPE | TANK | BOWL | WATER |
| C2 | PIPE | BOWL | DRAIN | WATER |
| C3 | CHAIN | HANDLE | FLAPPER | USERPRESS |
| C4 | HINGE | FLAPPER | TANK | |
| C5 | LEVER | FLOAT | VALVE | VECTOR |
| C6 | PIPE | VALVE | TANK | WATER |
| C7 | PIPE | SOURCE | VALVE | WATER |
| BEHAVIORS | | | | |
| *NAME* | *TYPE* | | | |
| FILL | TMK PROCEDURE | | | |
| FLUSH | METHOD | | | |
| FUNCTION | | | | |
| *NAME* | *BEHAVIOR* | | | |
| CLEAN | FLUSH | | | |
| *GIVEN NAME* | *GIVEN TYPE* | | | |
| CLEAN WATER | LIQUID | | | |
| FORCE ON HANDLE | FORCE | | | |
| *MAKES NAME* | *MAKES TYPE* | | | |
| CLEAN BOWL | CONTAINER | | | |
| *SUBSTANCE* | | | | |
| WATER | LIQUID | | | |
| USERPRESS | FORCE | | | |
| VECTOR | FORCE | | | |

SYSTEM AND METHOD FOR COLLECTING AND REPRESENTING KNOWLEDGE USING TASK-METHOD-KNOWLEDGE WITH STRUCTURE-BEHAVIOR-FUNCTION IN A COMPUTER SYSTEM

BACKGROUND

The present disclosure relates generally to the use of computer-based knowledge acquisition systems, and specifically to the gathering, representing, and processing of knowledge.

Artificial intelligence has long been a goal for those who design and develop computer systems. The development of such intelligence is directed toward designing systems which "think". It is hoped that thinking systems will be able to adapt to new situations, new problems, and new forms of input. For example, one goal of artificial intelligence is to solve problems by providing previously unanticipated solutions.

Under the broad umbrella of artificial intelligence, two main approaches have developed. The first approach, known as machine learning, is directed to developing computer systems with the ability to acquire knowledge on their own from observations or through instruction. The second approach, known as knowledge acquisition, is directed to developing computer systems in which the computers are "expert" in some area. This approach includes drawing knowledge from experts, encoding this knowledge for use in a computer system, and providing software programs which use the encoded knowledge to develop solutions. Knowledge acquisition systems are generally developed using the combined effort of knowledge engineers and software engineers. The knowledge engineers and software engineers interview experts to gain knowledge, capture the knowledge, and encode the knowledge in a computer-usable format. Software may then be developed to utilize the encoded knowledge. This development process is undesirable for a number of reasons. For example, the process is often expensive, generally requires specialized training, is an inefficient use of the expert's time, and is frequently unsuccessful in producing useful knowledge or solutions.

Therefore, it is desirable to develop improved knowledge acquisition techniques and applications.

SUMMARY OF THE INVENTION

A technical advance is provided by a novel system and process for enabling a user to utilize a plurality of knowledge acquisition approaches to find a solution to a task, where the knowledge acquisition approaches include a task-method-knowledge approach and a structure-behavior-function approach. In one embodiment, the process comprises defining the task by providing information specifying at least one input parameter, one output parameter, and an initial approach. The provided information is analyzed to determine whether to process the task using the task-method-knowledge approach or the structure-behavior-function approach based on the specified initial approach. The task is processed using the determined approach and the input parameter to achieve a solution. A determination is made as to whether the solution is correct by comparing the solution with the output parameter.

In another embodiment, if the determined approach is the task-method-knowledge approach, the process includes searching a plurality of existing methods for a method operable to provide at least a portion of the solution. If the method exists, it is selected. Alternatively, if the method does not exist, the method is defined.

In yet another embodiment, if the determined approach is the structure-behavior-function approach, the process includes searching a plurality of existing models for a model operable to provide at least a portion of the solution. If the model exists, it is selected. Alternatively, if the model does not exist, it is defined. A plurality of existing behaviors are searched for a behavior applicable to the model. If the behavior exists, the behavior is selected, which associates the behavior with the model. If the behavior does not exist, the behavior is encoded into the model using the task-method-knowledge approach.

DETAILED DESCRIPTION

The present disclosure relates to the use of computer-based knowledge acquisition systems, and more specifically to the gathering, representing, and processing of knowledge. It is understood, however, that the following disclosure provides many different embodiments, or examples, for implementing different features. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Figure 1:
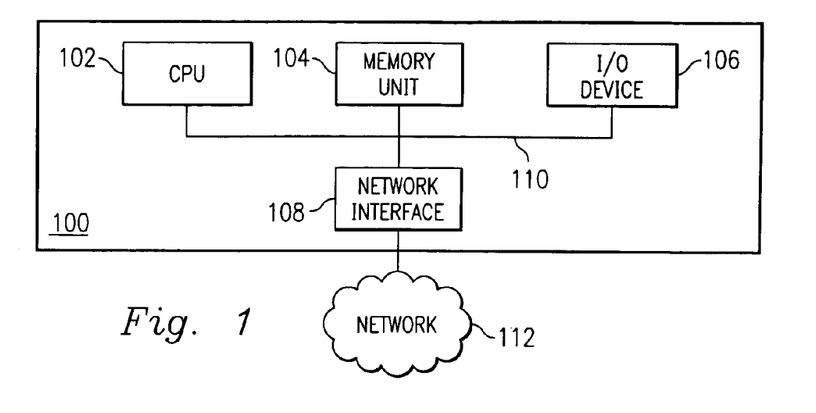
FIG. 1 illustrates a computer system on which a knowledge acquisition system may be practiced.

Referring now to FIG. 1, a computer system 100 is illustrated as a representative example of an operating environment for a knowledge acquisition system. The computer 100 includes a central processing unit ("CPU") 102, a memory unit 104, an input/output ("I/O") device 106, and may include a network interface 108. The components 102, 104, 106, and 108 are interconnected by a bus system 110. It is understood that each of the listed components may actually represent several different components. For example, the CPU 102 may actually represent a multi-processor or a distributed processing system; the memory unit 104 may include different levels of cache memory, main memory, hard disks, and remote storage locations; and the I/O device 106 may include monitors, keyboards, and the like. In addition, the network interface 108 may be connectable to a network 112. One or more of the memory devices 104 may contain data representing a programmed embodiment of a knowledge acquisition system, which may include a knowledge engine designed to process information.

In operation, a user may enter information into the system 100 in response to a display shown by a program designed for a particular task. The user may retrieve, review, modify, or enter new knowledge into the program until satisfied. The user may then define initial and desired values and parameters as input to the knowledge engine, which processes the knowledge to find a solution. If a solution is found, the results are displayed to the user. If a solution is not found, the user is informed and given an opportunity to make modifications to the parameters and repeat the process.

Figure 2:
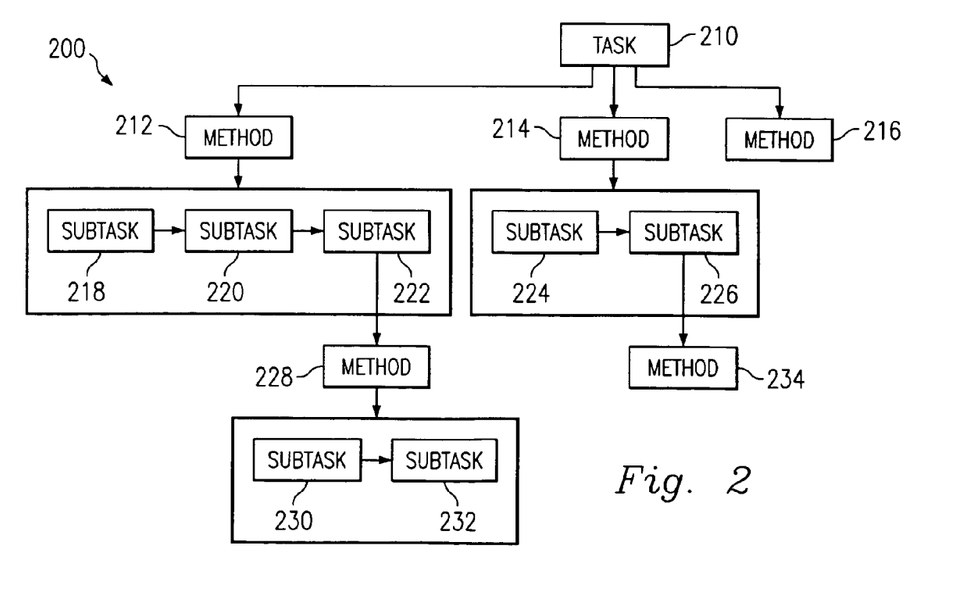
FIG. 2 illustrates a TMK hierarchy of a task, methods, and subtasks.
Figure 3:
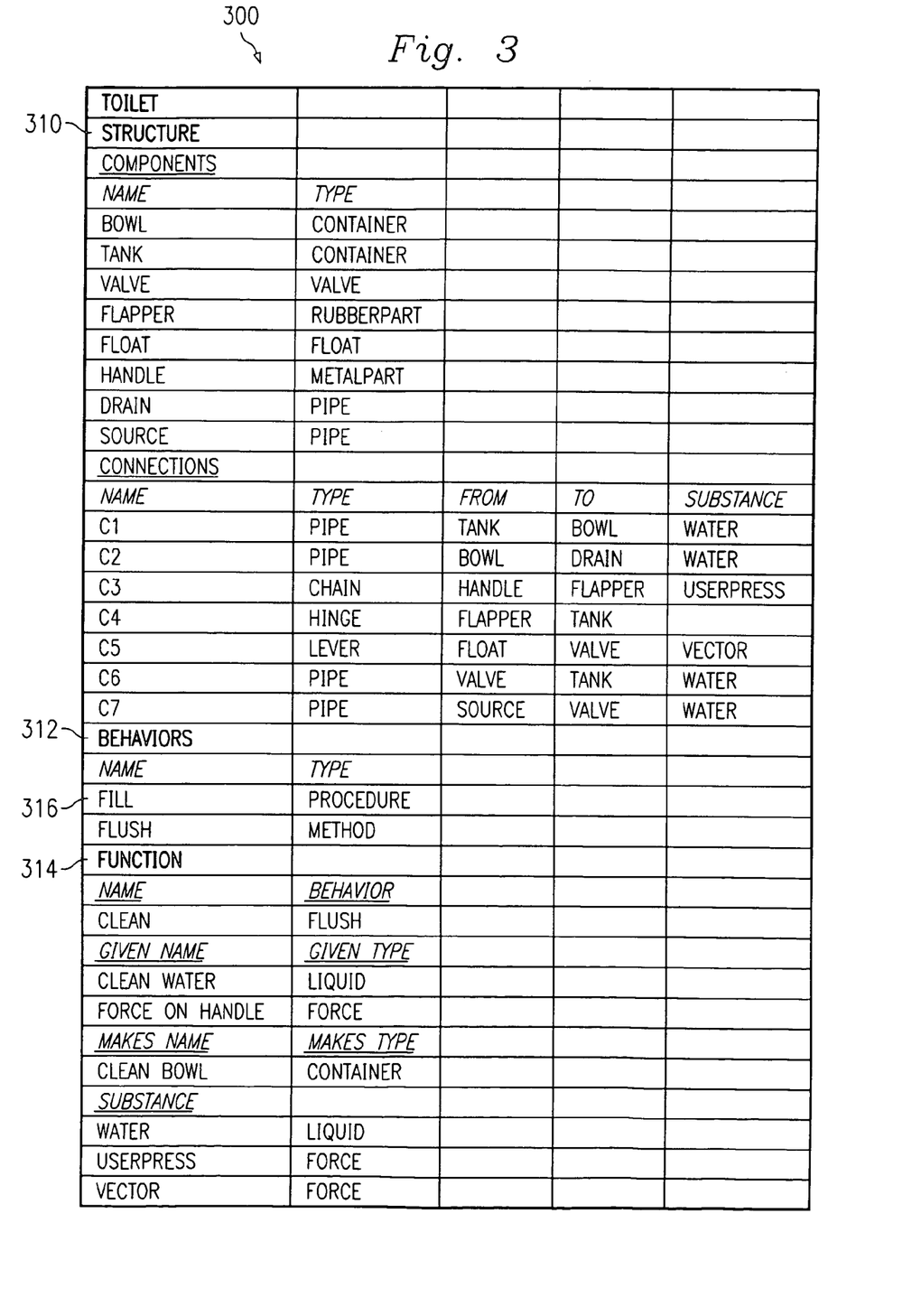
FIG. 3 illustrates an SBF table of structure, behavior, and function.

Referring now generally to FIGS. 2 and 3, two knowledge encoding approaches used in knowledge acquisition are illustrated. One approach (FIG. 2) utilizes a task-method-knowledge ("TMK") hierarchy that encodes problem-solving strategies in a hierarchy representing strategies developed by experts for specific problems. This approach began with research by Ashok Goel at the Georgia Institute of Technology in Atlanta, Ga.

The other approach (FIG. 3) encodes knowledge about artifacts and objects in terms of their structure, behaviors, and functions (and so named "SBF"), and explicitly specifies the structure and function of a device or object and the internal behaviors that explain how the device works. The encoded knowledge may be used to perform high-level design tasks. For example, the knowledge may be applied to modify an existing design to obtain a device which performs specific desired functions.

Referring now specifically to FIG. 2, a TMK hierarchy is illustrated by a tree of nodes 200. The tree 200 includes a task 210, which represents a high-level problem to be solved. In general, a TMK hierarchy may include any number of high-level task nodes. Methods 212, 214, and 216 represent three approaches to solving the task 210. Subtasks 218, 220, and 222 may provide input to method 212 as alternative approaches or as providing data that when combined with the data of the other subtasks satisfies method 212. Subtasks may themselves have methods which may have child subtasks, where the processing of a subtask involves the processing of associated subtasks. Similarly, subtasks 224 and 226 provide input to method 214. Method 216 has no subtasks and is typically called a "procedure", which is an atomic method. An atomic method is a process which does not spawn subtasks and may be an algorithm, a database retrieval, a request for user information, or a similar process. In a similar fashion, method 228 solves subtask 222, having itself subtasks 230 and 232. The TMK hierarchy may be extended by adding additional methods having subtasks and/or subtasks having methods or procedures. The hierarchy may be considered as "complete" when all end nodes ("leaves") are procedures.

The TMK hierarchy illustrated by the tree 200 utilizes "strategic" knowledge that applies the thought process of an expert to attack and solve a problem. Arriving at a solution may include identifying inputs to each of the tasks and identifying initial states, values, parameters, and knowledge. A knowledge engine utilizing the tree 200 begins at the main task and attempts to find a solution using the initial values and associated methods and procedures. If the problem is not solved directly, it may be broken down into subtasks. Each subtask is then processed to find a solution to that particular subtask.

For example, the high-level task 210 may be to design a new device such as a toilet. The task 210 may include a specific goal or may be bounded by a set of parameters. For example, the task 210 may be to design a toilet using less water. In this way, the task 210 may be defined by one or more desired features or properties. This high-level task 210 may be associated with several possible methods 212-216 leading to a solution of providing the desired design. The method 212 may reach a solution by designing an original toilet, while the method 214 may involve modifying a current design. The method 216 may look at designs of related non-toilet devices (e.g., pumps) and ways to modify them into a toilet. Each method 212-216 may have inputs. Accordingly, the method 212 may have as inputs a number of standard toilet specifications for tank and pipe capacities or pipe diameters, both of which enable the designer to design an original toilet. The method 214 may have current designs as input, while the method 216 may have designs of non-toilet devices as input. Likewise, each method 212-216 may include outputs. In the present illustration, the output is the solution of providing a new toilet design.

Each method 212-216 may be further broken down into subtasks/methods 218-234. The output of each subtask/method 218-234 may be the solution to the high-level task 210, input to a method, or input to another subtask. In the present illustration, the subtask 218 may design the tank. The subtask 220 may design the water flow through pipes and valves and may provide input to the subtask 218. The subtask 222 may design the handle which activates the flush of the toilet. The method 228 and subtasks 230, 232 may provide additional input into the design of the handle in subtask 222. The subtask 224 associated with the method 214, may be to find current toilet designs. This subtask may have methods (not shown) of using existing knowledge (e.g., the amount of water used by current designs) or may have several methods of acquiring the water use values (e.g., calculate from the size of a tank or lookup in a data base of device characteristics). The subtask 226 is to design a tank requiring less water and may be associated with a method 234 which determines how much water is needed to fill a tank.

In this manner, the problem is solved within the TMK hierarchy by decomposing the high-level task into methods and procedures which solve the problem, or by spawning subtasks which solve the problem or provide information needed by another task, subtask, or method.

TMK knowledge bases may be used to solve substantial problems. For example, they may analyze economic indicators or census data, invest in stock markets, predict the results of elections, diagnose disease, prescribe medicine, produce tax returns, and perform a variety of other complex tasks. TMK knowledge bases are applicable to problems which use expert knowledge to strategically find solutions by decomposing problems into smaller problems which are iteratively decomposed and solved.

However, TMK hierarchies do not provide artifact knowledge (e.g., information about specific instances of models). In the above example, the goal of subtask 226 is to design a tank requiring less water, and while it may be decomposed further to define the strategic methods to accomplish this goal, TMK does not avail itself of the details of the newly designed tank (e.g., dimensions, materials, fluids and their flow through the device). Using TMK alone, the solution to subtask 226 requires specific and customized programming or other means for determining the size of the newly designed tank.

Referring now specifically to FIG. 3, an SBF artifact is illustrated as a table 300, although a state machine may be utilized to identify the components, substances, and connections, as well as the flow of substances through defined connections between components. SBF knowledge bases which include such artifacts may be used for device and object structure, behavior, and function. Once entered, this knowledge may be used to examine the design of the models in order to perform such functions as improving or modify the designs. Additionally, the knowledge may be used to design L an entirely new model. In contrast to TMK, which focuses on a task driven approach to solving a problem using known techniques, SBF organizes and makes available information.

An artifact is defined in terms of structure, behavior, and function. SBF knowledge has input and output values. To find a solution for an SBF knowledge set, known inputs and desired outputs are declared and the state machine tables are solved for the desired outputs. Generally, SBF knowledge is divided into "models" and "instances". A model is a template into which values are placed, while an instance is a set of values for a model. Accordingly, the inputs are desired values for a model and the outputs are instances which meet the specified input values. The inputs may comprise a structure, behavior, function, or a combination of these. The outputs would be instances which have the specified values.

For example, consider a knowledge base of toilets. There are a large number of toilet designs which may be divided into a number of different categories. For example, toilets may be distinguishable as intended for home use or for use in remote locations. Alternatively, they may be stationary versus portable. As illustrated in FIG. 3, a specific toilet may be described in terms of its structure 310 (size, components, etc.), behaviors 312 (flush, fill, etc.), and functions 314 (press handle, clean tank, etc.).

Accordingly, the knowledge embodied in the SBF knowledge base could be used to design a toilet having specific properties. For example, suppose a designer wanted to design a toilet which uses 40% less water. The designer may use the knowledge base by retrieving (through special purpose software) existing toilets having desired structures, behaviors, functions, or a combination of these.

For example, the designer might request a list of all toilet designs having a particular tank capacity or having water flow rates within a given range. The list of toilets matching the defined criteria would be provided to the designer, who could then make modifications to arrive at a design of the desired specifications. This new toilet could be added to the knowledge base for use in subsequent designs.

The SBF approach is limited, however, because it does not contain strategic design information. While it may provide a model for toilets, instances of these models, and state diagrams for the behavior of toilets, there is no processing of these models, instances or state diagrams within the SBF knowledge base. The processing of this information requires specific programming to investigate and process artifact information.

Thus, the two knowledge encoding approaches represented by TMK and SBF differ in a number of ways. Accordingly, one approach may be more suitable for a particular type of knowledge than the other. This suitability influences the selection of a particular approach for a specific type of problem. The TMK language focuses on process or strategic knowledge, while the SBF language represents artifact, device, or object knowledge. These two types of knowledge are ontologically different, and current knowledge systems are generally designed to use either TMK or SBF.

Figure 4A:
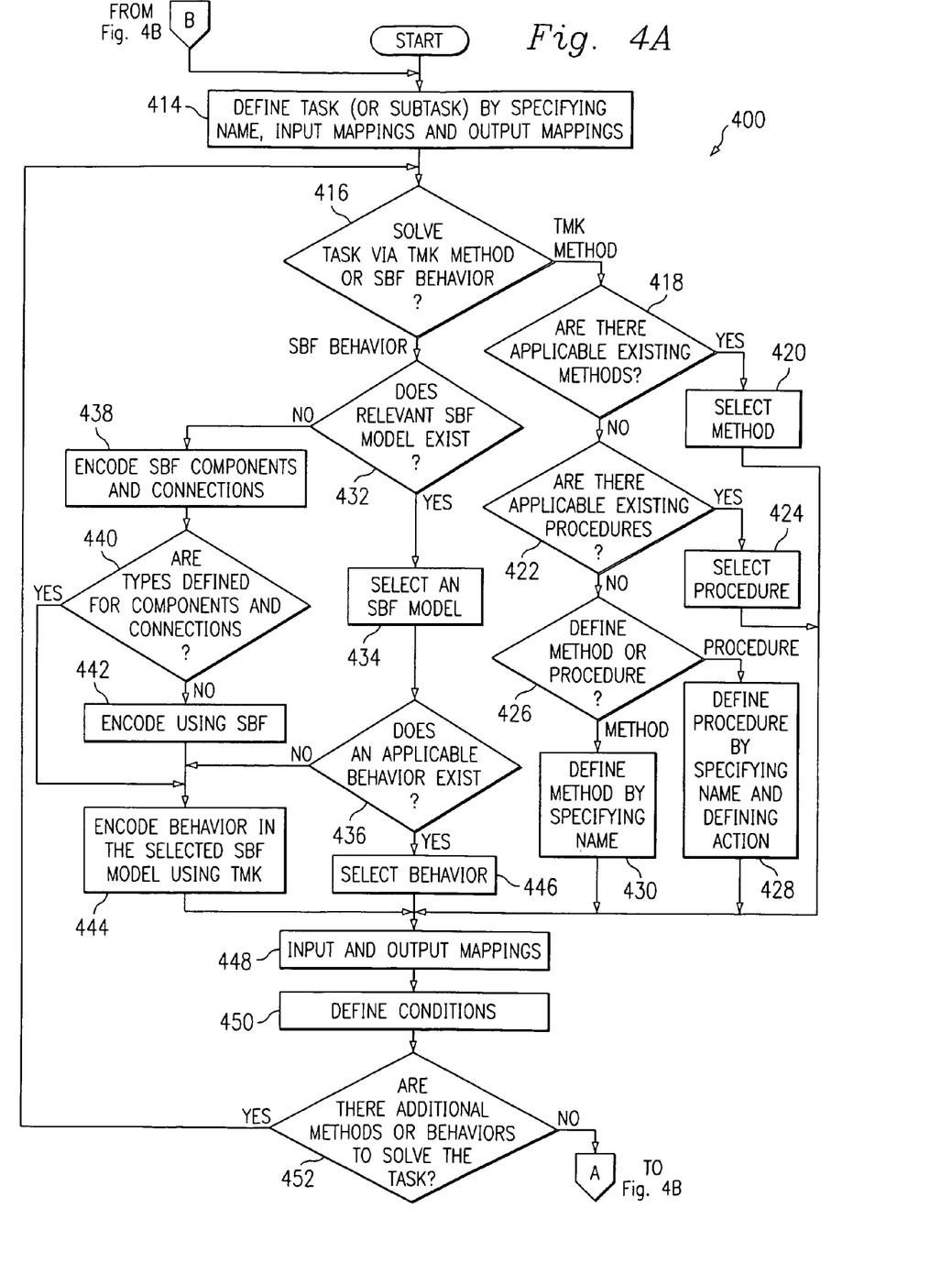
FIG. 4 is a flowchart of a method for combining a TMK and an SBF approach.
Figure 4B:
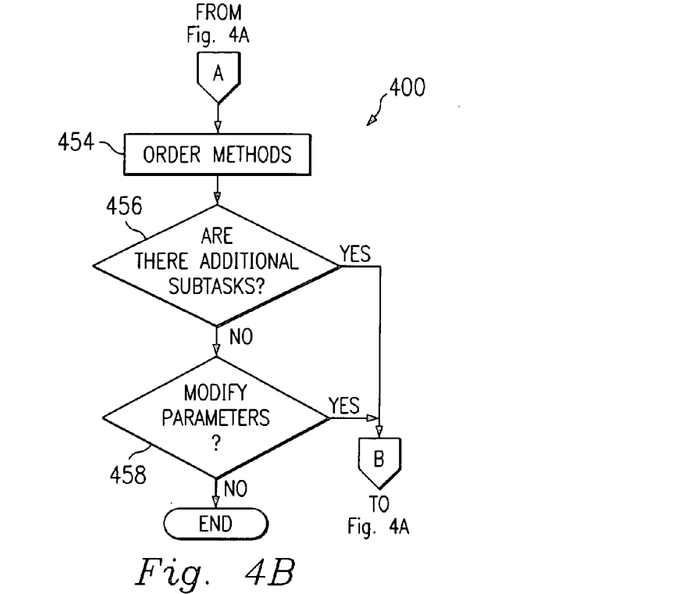

Referring now to FIG. 4, a process 400 for combining the TMK and SBF approaches is illustrated which allows the solution of problems which benefit from the application of both TMK and SBF knowledge. For example, consider a designer who is trying to develop a new toilet design with specific design criteria. The criteria may be to use less water, to be quieter or smaller, or may include a new feature such as a full-flush or half-flush selection. The designer would have several strategic approaches to this new design such as starting from first principles and designing an entirely new toilet, modifying an existing toilet design, or starting with a related non-toilet device, such as a pump, and then designing the toilet around the pump design. Each of these strategic approaches may start as a high-level task, divided into methods, procedures, and subtasks. The subtasks may be further divided into methods, procedures, and additional subtasks. At some point in each of the approaches, the designer may need artifact knowledge that may be unique for each approach. For example, the designer may need artifact knowledge such as the design of various valves, pipes, levers, the design of existing toilet models, or non-toilet devices which match desired toilet functions. The process 400 enables the TMK and SBF approaches to be utilized in a coordinated manner.

The process 400 begins by defining one or more input parameters (e.g. input mappings) in step 414. The input parameters may include such information as initial values. Output parameters (e.g., output mappings) that enable desired solution values to be specified may also be defined in step 414. A determination is made in step 416 as to whether the task is to be processed using a TMK method or an SBF behavior. This determination may be based on information specifying an initial approach provided when the task was defined in step 414. Alternatively, the initial approach may be determined by the examination of other information, such as the input and/or output parameter.

If the task is to be processed using a TMK method, the process 400 determines whether there are associated methods in step 418. If there are associated methods, then one of the methods is selected in step 420. If there are no associated methods, the existence of applicable procedures is determined in step 422. If there are one or more applicable procedures, one of the procedures is selected in step 424. If there are no applicable methods or procedures, then a choice is made as to whether a method or a procedure should be defined in step 426. Depending on the choice made in step 426, a procedure may be defined in step 428 by specifying the name and at least one defining action of the procedure, or a method may be defined in step 430 by specifying the name of the method. The steps 420, 424, 428, and 430 each continue to the step 448, which will be described later in greater detail.

Figure 6:
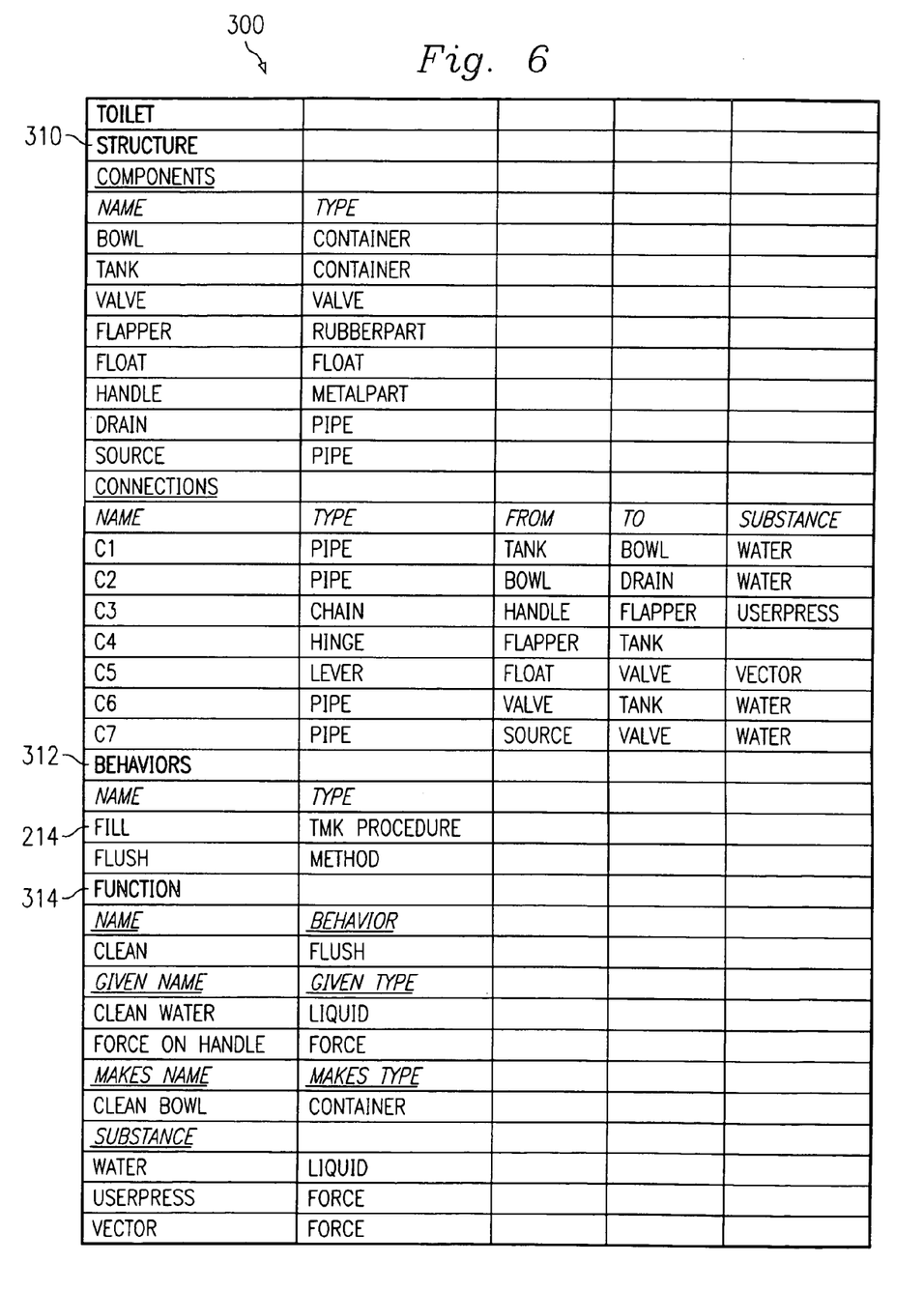
FIG. 6 illustrates an SBF table with a TMK hierarchy as a behavior.

If it is determined in step 416 that the task is to be processed using an SBF behavior, the process 400 continues to step 432, where a check is made to see if an applicable SBF model exists. If the SBF model exists, the model is selected in step 434 and the process 400 proceeds to step 436, where it is determined whether an applicable behavior exists for the selected SBF model. If the behavior exists, it is selected in step 446. If the behavior does not exist, it may be encoded in the SBF model using a TMK hierarchy (e.g., recursively defining the method in TMK via the process 400) in step 444. Returning to the determination made in step 432, if an applicable SBF model does not exist, the process 400 continues to step 438, where components and connections may be defined for the SBF model. In step 440, a determination is made as to whether the desired types of components and connections exist. If the components or connections do not exist, then they may be encoded as SBF models in step 442 (as illustrated in FIG. 6) and the SBF model's desired behavior may be encoded using a TMK hierarchy in step 444. If the desired components and connections do exist, the process 400 continues to step 444, where the SBF model's desired behavior may be encoded using a TMK hierarchy. Steps 444 and 446 both proceed to step 448.

In step 448, the inputs and outputs from the task are mapped to the method or procedure, which means that the part of the SBF model that is of interest to the method is selected and given a name. More specifically, mapping means assigning SBF objects or parts of those objects to the names of the input or output. Accordingly, an input named X could be assigned my-SBF-model1.component1 (e.g., X<=my-SBF-model1.component1). In addition, this assignment may come from the method above or the subtask preceding the current subtask. In step 450, the conditions are defined for when to use the method or procedure. These conditions may also depend on the knowledge mapped from the above task. If multiple methods or behaviors for a task are known or desired by the user, the process 400 may include a check for this in step 452 and then return control to step 416 if the answer is affirmative. If there are no additional methods or behaviors to solve the task, the methods are ordered for processing in step 454.

After processing a method, a determination is made in step 456 as to whether the task is the final task. If not, the process 400 returns to step 414 to process the next task or subtask. If the determination is made in step 456 that there are no additional subtasks, the user may have the option to go back through the hierarchy and modify parameters via step 458. After the modification occurs, the process returns to step 414. If the parameters are satisfactory, the process 400 ends.

The recursion enabled by the process 400 allows an invoking instance to complete as all of the instances which it invoked complete. This continues until all invoked instances of the initial instance complete, and the initial instance itself completes. Accordingly, the success or failure of the initial task (the initial instance of the process 400) determines if an overall solution has been found. The solution may be found using a combination of TMK and SBF approaches for different instances.

Figure 5:
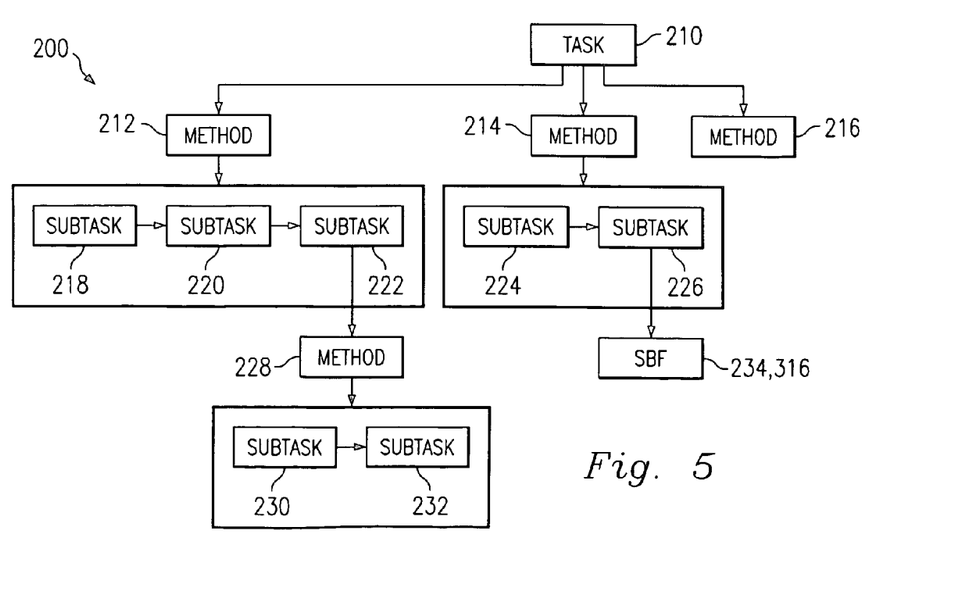
FIG. 5 illustrates a TMK hierarchy with an SBF table as a method.

Referring now to FIG. 5, in one embodiment, portions of the TMK hierarchy 200 of FIG. 2 and the SBF hierarchy 300 of FIG. 3 may be combined as illustrated in FIG. 4 to provide an improved knowledge acquisition system wherein a solution of an SBF model may be utilized as a method of a TMK strategy. That is, in the design of a toilet from first principles for using less water than existing designs, one of the methods would be to find a water tank with the desired capacity. The solution to this method may entail locating the SBF model for tanks which meet certain capacity criteria. The method may also request other criteria, for example, material, dimensions, and/or openings sizes. At some point in the modification of an existing design, the TMK method may select existing toilet designs with specific desired criteria. In the same way, the TMK strategy for design from non-toilet devices may at some point request devices matching desired characteristics.

In the current example, the method 214 of the TMK tree 200 of FIG. 2 is to modify a current design to provide a solution. As described previously, the method 214 is associated with a subtask 226 and a method 234. The method 234 may be replaced by an SBF artifact, such as the "Fill" element 316 from the behaviors 312 of FIG. 3. Accordingly, when the method 234 is selected, the associated SBF is solved and the output of the SBF becomes the output of the method 234 to be used in subsequent TMK processing. More specifically, an output of the "Fill" process may be the amount of water needed to fill the tank, which is determined in the SBF processing of one or more selected designs. This enables the TMK tree 200 to utilize the benefits provided by the SBF hierarchy 300.

Referring now to FIG. 6, in another embodiment, portions of the TMK hierarchy 200 of FIG. 2 and the SBF hierarchy 300 of FIG. 3 may be combined as illustrated in FIG. 4 to provide an improved knowledge acquisition system wherein SBF models may call on TMK strategic knowledge as device "behavior". That is, a device behavior may be defined in terms of tasks, methods, procedures, and subtasks, and the output of such behavior may be determined both by the defined behavior and by the initial inputs to the knowledge system. For example, in the design of a toilet using less water, the "Fill" behavior 316 of FIG. 3 may call on a strategic solution (TMK) to the problem of how much water is used. The TMK solution may call on processing tasks to determine information such as the size of pipes (e.g., in the design's current stage), the time the valve is open (e.g., based on a timer or the length of a designed lever arm), or other strategic processing.

In the current example, the "Fill" behavior 316 of FIG. 3 uses the method 214 of FIG. 2. That is, the method 214 is the task identified as modifying a current toilet design, so that when the "Fill" behavior is processed, the results are dependent on the state of the modified design. The method 214 may process through the subtask 226 and the method 234 to find a solution. Accordingly, to determine the "Fill" behavior, the outputs of the modified design may be used. It is noted that the "Fill" behavior may be associated with either of the other methods 212 or 216 of FIG. 2, which may provide the output of "Fill" for an original design or a non-toilet modification, respectively.

Accordingly, the combination of TMK and SBF, by using SBF models as methods in TMK hierarchies and using TMK strategies as SBF behaviors, allows the definition and solution of problems not addressed by either method alone. The combination of TMK and SBF provides a unified and symmetric approach to knowledge processing. From within the TMK hierarchy, the designer can incorporate all of the power of the SBF approach by including it as a method of a task. Similarly, from within the SBF structure of models and instances, the full power of TMK can be included as artifact behaviors and functions. Thus, the combination provides what neither approach does alone: namely, the combination of strategic and artifact knowledge. The designer can start with either SBF or TMK, or start with existing SBF models or existing TMK hierarchies, and then add and include the other form of knowledge at the appropriate point. This may be accomplished by declaring a TMK method to be the behavior or function of an SBF artifact, or by declaring an SBF state diagram to be the method of a TMK hierarchy.

Figure 7:
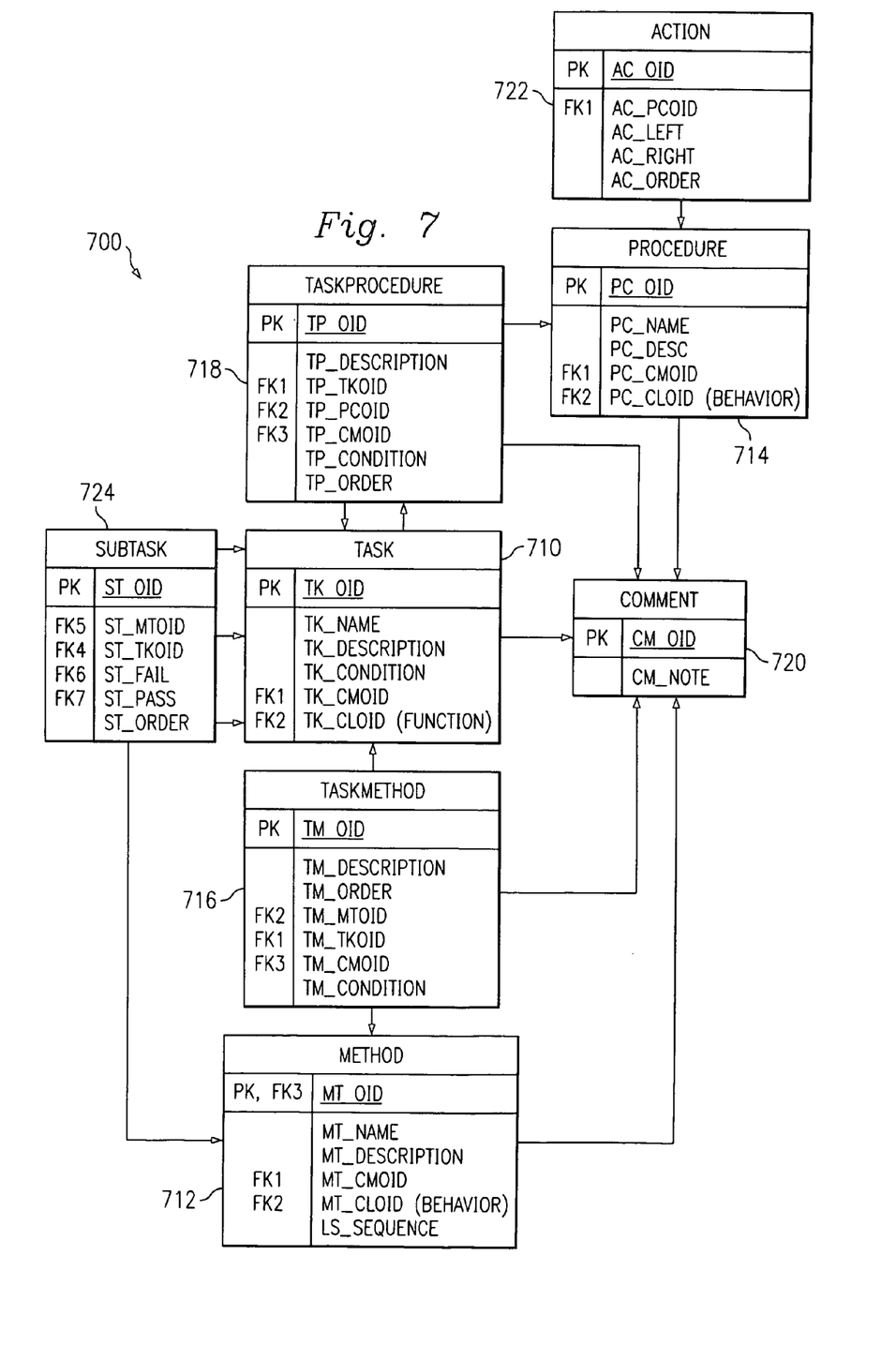
FIG. 7 illustrates TMK data stored in a collection of relational database tables.

Referring now to FIG. 7, in another embodiment, an implementation of a knowledge acquisition system may utilize both TMK and SBF knowledge stored in relational data base tables. FIG. 7 illustrates an example of a table structure 700 for TMK knowledge. Task table entries may include the name and description of the task represented, and a reference to an optional comment. The entry may also include an optional success condition for the task, as well as a reference to an SBF model (also called a "class") for which this task is the function. Accordingly, when an SBF model of this class is being solved, the TMK entry for this task is used and processed.

The task 710 is related to a method 712 and a procedure 714 using TaskMethod 716 and TaskProcedure 718 table entries. For purposes of clarity, although it is understood that multiple methods and procedures may exist, only a single method 712 and a single procedure 714 will be discussed. The table entries contain information about the relationship between the task 710 and the procedure 714, or the task 710 and the method 712. The information may include the name of the method/procedure, a description, and/or a comment about the relationship; a condition under which the method or procedure may be executed, and if more than one condition is met, the order in which they are run; and references to any parent tasks and the child methods for the relationship. Thus, when the task 710 is selected, all related methods and procedures can be found along with the conditions under which they are run. They may then be executed in a specified order.

The procedure 718 may include the name, description, and an optional comment 720. If the procedure 718 is the behavior of an SBF model, the entry may include a reference to that model. The procedure 718 may also include a reference to an action 722 (which may be an algorithm, data base look-up, or some other function) that implements the procedure 718.

The method 712 may include the name, description, and an optional comment 720. If the method 712 is the behavior of an SBF model, the entry includes a reference to that model. The method 712 may have an associated subtask 724. The subtask 724 may have references to its parent method 712 and the task 710 which spawned the method 712. The subtask 724 may specify a subtask (not shown) which is to be run if the subtask 724 is successful, and a subtask (not shown) which is to be run in the case the subtask 724 is unsuccessful.

Each of these table entries may have a comment 720 associated. Thus each entry has an optional reference to a comment table entry, which entry may include a a long comment about the related entry.

In operation, a knowledge engine starts with the desired task 710 and attempts to solve it using the TaskMethod 716 and TaskProcedure 718 to locate the associated method 712 and procedure 714. The method 712 may spawn the subtask 724 to complete its processing, or it may invoke an SBF class to provide the method's output. The procedure 714 may call on the action 722 to produce the procedure's output, or it may invoke an SBF class to provide the procedure's output. Accordingly, the processing of a TMK hierarchy may include the invocation of an SBF class for processing for either methods or procedures.

Figure 8:
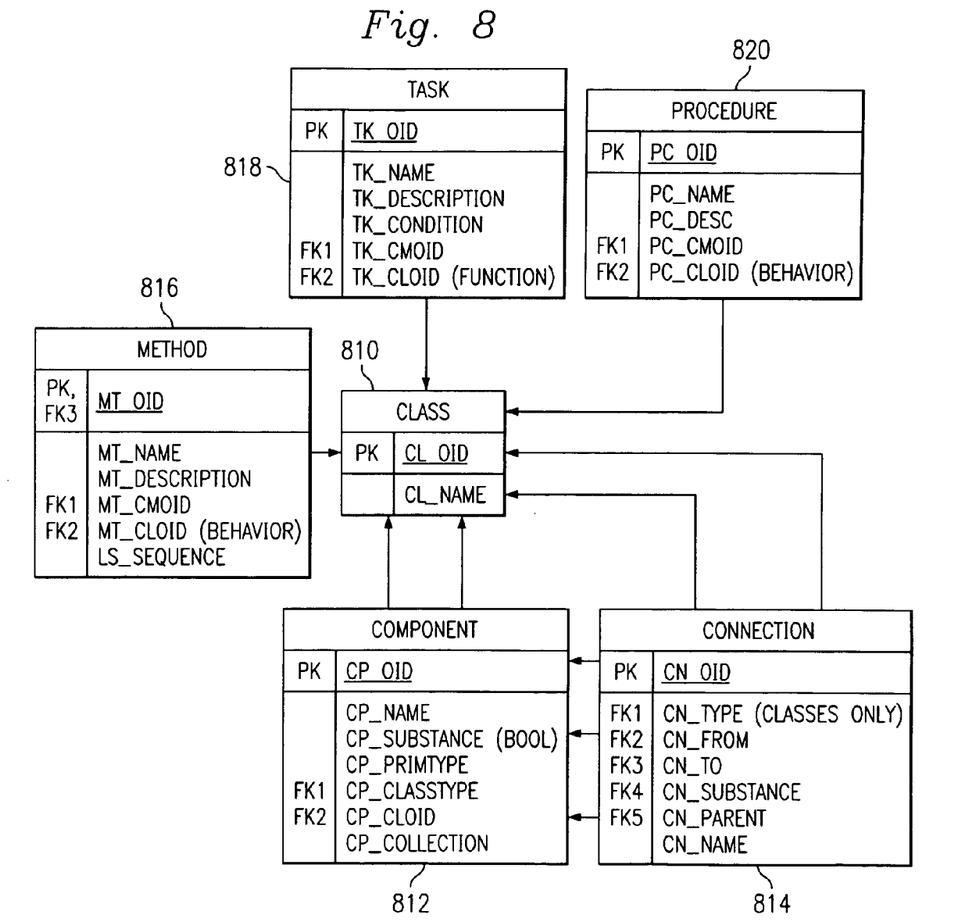
FIG. 8 illustrates SBF data stored in a collection of relational database tables.

Referring now to FIG. 8, an implementation enabling methods and procedures to reference an SBF class 810 as described above is illustrated. The SBF class 810 is implemented through a component 812 and a connection 814. For purposes of clarity, although it is understood that multiple components, connections, methods and procedures may exist, only a single example of each will be discussed. The table entries embodying the component 812 and the connection 814 are used by the SBF knowledge engine to locate instances of a model which satisfy the inputs to the processing. The SBF class 810, a method 816, a task 818, and a procedure 810 enable the SBF knowledge engine to locate and process a related TMK hierarchy when solving the SBF class 810. Generally, in an SBF engine, the function of an artifact is static and coded as data in the representation of the instance of the model in the SBF database. When solving SBF, the knowledge engine would locate and return instances matching the desired function input with the value in the SBF database. In the present embodiment, the function is not static, and may be calculated as the output of the processing of a TMK hierarchy.

While the preceding description particularly shows and describes one or more embodiments, it will be understood by those skilled in the art that various changes in form and detail may be made therein without departing from the spirit and scope of the present disclosure. For example, it is within the scope of the present disclosure to use a plurality of methods, procedures, and other processing techniques to provide a solution to a given task. In addition, multiple relationships between TMK and SBF information may be utilized in developing a desired solution. Therefore, the claims should be interpreted in a broad manner, consistent with the present disclosure.

What is claimed is:

1. Software, recorded on a computer-readable medium, for enabling a user to utilize a plurality of knowledge acquisition approaches to find a solution to a task using a task-method-knowledge approach and a structure-behavior-function approach, the software performing the steps of:
   acquiring a task by receiving information specifying at least one input parameter, one output parameter, and an initial approach;
   analyzing the provided information using the task-method-knowledge approach and the structure-behavior-function approach based on the specified initial approach;
   processing the task using the determined approach to achieve a solution, the processing utilizing the input parameter;
   the processing further comprising using a structure-behavior-function behavior and encoding the behavior using a task-method-knowledge hierarchy which is collected from the user;
   the processing further comprising using a task-method-knowledge hierarchy and encoding the input parameter and the output parameter using a structure-behavior-function model which is collected from the user.

2. The software of claim 1 further including, if the determined approach is the task-method-knowledge approach:
   searching a plurality of existing methods for a method operable to provide at least a portion of the solution;
   selection, by user input, the method if the method exists; and acquiring a user-defined method, encoded using a task-method-knowledge hierarchy, if the method does not exist.

3. The software of claim 2 further including:
   searching a plurality of existing procedures for a procedure rather than searching for a method, the procedure operable to provide at least a portion of the solution;
   selecting the procedure if the procedure exists; and acquiring a user-defined procedure if the procedure does not exist.

4. The software of claim 2 further including, if the determined approach is the structure-behavior-function approach:
   searching a plurality of existing models for a model operable to provide at least a portion of the solution;
   selection the model if the model exists;
   acquiring a user-defined model if the model does not exist;
   searching a plurality of existing behaviors for a behavior applicable to the model;
   selecting the behavior if the behavior exists, the selection associating the behavior with the model; and encoding the behavior into the model using the task-method-knowledge approach if the behavior does not exist.

5. The software of claim 4 wherein acquiring a user-defined model further includes:
  searching a plurality of existing components and existing connections for a first component, a second component, and a connection between the first and second components operable to represent the model; and
  if at least one of the first component, the second component, or the connection does not exist, defining the first component, the second component, or the connection which does not exist.

6. The software of claim 4 further including mapping either the input parameter of or the output parameter to at least a portion of the first model, the mapping operable to assign the mapped parameter to the portion.

7. The software of claim 4 further including defining an event, the event operable to identify when to use the method.

8. The software of claim 4 further including determining the existence of at least one other method.

9. The software of claim 2 further including providing a processing order, the processing order operable to define the order in which the method will be processed relative to a plurality of other methods awaiting processing.

10. The software of claim 1 further including:
  determining whether the user desired to modify at least one of the input or output parameters; and modifying at least one of the input or output parameters if the user so desires.

11. A computer-readable medium for storing a computer executable software program for determining a solution to a task using a plurality of knowledge acquisition approaches, the program including instructions for:
  defining the task as an input parameter, collected from a user, encoded using a first structure-behavior-function model;
  defining the solution as an output parameter, collected from the user, encoded using a second structure-behavior-function model;
  selecting a knowledge acquisition approach from a group consisting of a task-method-knowledge approach or a structure-behavior-function approach processing the task using the selected approach;
  determining whether the task includes at least one portion to be processed using the non-selected approach;
  the determining of the solution of the task further comprising using a structure-behavior-function behavior and encoding the behavior using task-method-knowledge hierarchy which is collected from the user.

12. The medium of claim 11 wherein the program further includes instructions for storing the output parameter generated by processing the portion; and using the output parameter as an input to the task.

13. The medium of claim 11 wherein the program further includes instructions for redefining the task if the solution is not found.

14. The medium of claim 11 wherein the program further includes instructions to provide at least one interface enabling interaction with the program.

15. The medium of claim 11 wherein the program further includes instructions for redefining the solution if the solution is not found.

16. A computer system for providing a solution to a task through information processing, the system including:
  a processor;
  a memory accessible to the processor; and software, a portion of which is stored in the memory, the software including instructions for:
  accepting at least a first parameter, encoded as a first structure-behavior-function model, to define the task;
  accepting at least a second parameter, encoded as a second structure-behavior-function model, to define the solution;
  accepting an initial approach for processing the task;
  determining whether to use a task-method-knowledge approach or a structure-behavior-function approach for processing the task, the determination based on the specified initial approach;
  processing the task using the determined approach based on the first parameter
  the processing of the task further comprising using a structure-behavior-function behavior and encoding the behavior using a task-method-knowledge hierarchy which is collected from a user, and
  determining whether the solution is found based on the second parameter.

17. The system of claim 16 wherein the software further includes instructions for, if the determined approach is the task-method-knowledge approach:
  determining whether a first portion of the task should be processed independently;
  determining whether to use the task-method-knowledge approach or the structure-behavior-function approach for processing the first portion if the first portion of the task should be processed independently; and
  processing the first portion using the determined approach.

18. The system of claim 17 wherein the software further includes instructions for, if the determined approach is the structure-behavior-function approach:
  determining whether a second portion of the task should be processed independently using the task-method-knowledge approach; and
  processing the second portion using the task-method-knowledge approach if the second portion should be processed independently.

19. The system of claim 16 wherein the software further includes instructions for modifying the first parameter if the solution is not found.

20. The system of claim 16 wherein the software further includes instructions for modifying the second parameter if the solution is not found.

* * * * *